United States Patent
Grass et al.

(10) Patent No.: US 8,446,408 B2
(45) Date of Patent: May 21, 2013

(54) 3D-2D ADAPTIVE SHAPE MODEL SUPPORTED MOTION COMPENSATED RECONSTRUCTION

(75) Inventors: Michael Grass, Buchholz in der Nordheide (DE); Volker Rasche, Erbach (DE); Dirk Schaefer, Hamburg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 1201 days.

(21) Appl. No.: 11/997,340

(22) PCT Filed: Jul. 12, 2006

(86) PCT No.: PCT/IB2006/052375
§ 371 (c)(1),
(2), (4) Date: Jan. 30, 2008

(87) PCT Pub. No.: WO2007/015181
PCT Pub. Date: Feb. 8, 2007

(65) Prior Publication Data
US 2008/0218510 A1 Sep. 11, 2008

Related U.S. Application Data

(60) Provisional application No. 60/705,616, filed on Aug. 4, 2005.

(51) Int. Cl.
*G06T 15/00* (2011.01)

(52) U.S. Cl.
USPC .......................................................... 345/419

(58) Field of Classification Search
USPC .................. 345/419; 382/128; 378/4
See application file for complete search history.

(56) References Cited

U.S. PATENT DOCUMENTS

| 2003/0194119 A1 | 10/2003 | Manjeshwar et al. |
| 2004/0082846 A1* | 4/2004 | Johnson et al. ................ 600/410 |
| 2004/0136490 A1* | 7/2004 | Edic et al. .......................... 378/4 |
| 2006/0147114 A1 | 7/2006 | Kaus et al. |

FOREIGN PATENT DOCUMENTS

| JP | 2004033749 A | 2/2004 |
| WO | WO 2004068412 A1 * | 8/2004 |

(Continued)

OTHER PUBLICATIONS

Vidya Elangovan et al., "From Sinograms to Surfaces: A Direct Approach to the Segmentation of Tomographic Data", Lecture Notes in Computer Science, vol. 2208, Oct. 14, 2001, pp. 213-223, XP007901427.

(Continued)

*Primary Examiner* — Xiao M. Wu
*Assistant Examiner* — Scott E Sonners (57) ABSTRACT

A method for generating or reconstruction of three-dimensional (3D) images corresponding to a structure of interest (60) including: acquiring a plurality of image projections corresponding to a structure of interest (60); applying a shape model (66) at a selected 3D seed point (64); and adapting the shape model (66) to represent the structure of interest (60), yielding an adapted shape model. A system for generation and reconstruction of three-dimensional (3D) images. The system (10) includes: an imaging system (12) configured to provide projection data corresponding to a structure of interest (60); and a controller (50) in operable communication with the imaging system (50). The controller (50) is configured to: receive the projection data, (64); apply a shape model (66) at a selected 3D seed point (64); and adapt the shape model (66) to represent the structure of interest (60), thereby yielding an adapted shape model.

26 Claims, 5 Drawing Sheets

FOREIGN PATENT DOCUMENTS

| WO | W02004111936 | | 12/2004 |
|---|---|---|---|
| WO | WO 2004111936 | A1 * | 12/2004 |
| WO | WO 2005020155 | A1 * | 3/2005 |

OTHER PUBLICATIONS

T. McInerney et al., "Deformable Models in Medical Analysis: A Survey", Medical Image Analysis, Oxford University Press, Oxford, GB, vol. 1, No. 2, Jun. 1996, pp. 91-108, XP002230283.

Elangovan et al, "From Sinograms to Surfaces: A Direct Approach to the Segmentation of Tomographic Data", Lecture Notes in Computer Science, vol. 2208, Oct. 2001, pp. 213-223.

McInerney et al., "Deformable Models in Medical Image Analysis: A Survey", Medical Image Analysis, vol. 1, No. 2, Jun. 1996, pp. 91-108.

* cited by examiner

FIG. 5A — FORWARD PROJECION

FIG. 5B — BOUNDARY DETERMINATION

FIG. 5C — SHAPE ADAPTATION

3D-2D ADAPTIVE SHAPE MODEL SUPPORTED MOTION COMPENSATED RECONSTRUCTION

CROSS REFERENCE TO RELATED APPLICATIONS

This application claims the benefit of International Application Number PCT/IB2006/052375, filed Jul. 12, 2006, and U.S. Provisional Application Ser. No. 60/705,616 filed Aug. 4, 2005 which are incorporated herein in whole by reference.

The present disclosure is directed to a methodology for compensating motion in 3D and 4D image reconstructions. Particularly motion compensation and augmentation of images generated with X-ray fluoroscopy and the like based on an adaptive shape model.

In X-ray guided cardiac interventions, as e.g. for electro physiology interventions, 3D and 4D reconstructions of a target ventricular structure are often utilized in order to plan and guide the intervention. Currently, these data can, if necessary, be acquired pre-intervention using a different imaging modality. However, with this approach, data may not be the most current. In addition, data acquired with a different imaging modality have to be registered with respect to the actual imaging information used for guidance adding cost, time and complexity.

Furthermore, patient motion during any kind of imaging leads to inconsistent data and hence to artifacts such as blurring and ghost images. Therefore, patient motion has to be avoided or compensated. Practically, avoiding motion, e.g., fixation of the patient is generally difficult or impossible. Thus compensation of/for patient motion is most practicable. The majority of motion compensation methods focus on how to obtain consistent projection data that all belong to the same motion state and then use this sub-set of projection data for reconstruction. Using multiples of such sub-sets, different motion states of the measured object can be reconstructed. For example, one method employed parallel re-binning cone-beam backprojection to compensate for object motion and time evolution of the X-ray attenuation. A motion field is estimated by block matching of sliding window reconstructions, and consistent data for a voxel under consideration is approximated for every projection angle by linear regression from temporally adjacent projection data from the same direction. The filtered projection data for the voxel is chosen according to the motion vector field. Other methods address motion effects in image reconstructions using a precomputed motion vector field to modify the projection operator and calculate a motion-compensated reconstruction.

Despite efforts to date, a need remains for an effective and cost effective methodology to generate a 3D/4D data set. Particularly beneficial would be generating a 3D/4D data set on the imaging system, which is also used for the intervention. Furthermore, it would be beneficial to conduct this imaging for intervention concurrent therewith to avoid additional expenses and time associated with additional laboratory time and image registration.

In an exemplary embodiment disclosed herein is a method for generating or reconstruction of three-dimensional (3D) images based on image projection data corresponding to a structure of interest. The method includes: acquiring a plurality of image projections corresponding to a structure of interest with angular coverage sufficient to facilitate the generating or reconstruction of the 3D images from said image projections; selecting a 3D seed point; applying a shape model at the 3D seed point; and adapting the shape model to represent the structure of interest, thereby yielding an adapted shape model.

According to exemplary implementations, in another optional embodiment, the abovementioned methodology may further include: acquiring data indicative of motion of the structure of interest associated with the image projections; adapting the shape model to represent the structure of interest based on the data indicative of motion of the structure of interest, thereby yielding another adapted shape model; and generating the 3D images of the structure of interest based on the other adapted shape model.

Further, in another exemplary embodiment, there is disclosed herein a system for generation and reconstruction of three-dimensional (3D) images. The system includes: an imaging system configured to provide image projection data corresponding to a structure of interest with angular coverage sufficient to facilitate the generating or reconstruction of the 3D images from said image projections; and a controller in operable communication with the imaging system. The controller is configured to: receive the image projection data; select a 3D seed point; apply a shape model at the 3D seed point; and adapt the shape model to represent the structure of interest, thereby yielding an adapted shape model.

Also disclosed herein, in yet another exemplary embodiment, is a system for generation or reconstruction of three-dimensional (3D) images. The system includes: means for acquiring a plurality of image projections corresponding to a structure of interest with angular coverage sufficient to facilitate the generating or reconstruction of the 3D images from said image projections; means for selecting a 3D seed point; means for applying a shape model at the 3D seed point; and means for adapting the shape model to represent the structure of interest, thereby yielding an adapted shape model.

Further disclosed herein, in yet another exemplary embodiment, is a storage medium encoded with a machine readable computer program code, the code including instructions for causing a computer to implement the abovementioned method for generation or reconstruction of three-dimensional (3D) images.

Disclosed herein, in another exemplary embodiment, is a computer data signal; the computer data signal comprising instructions for causing a computer to implement the abovementioned method for generation or reconstruction of three-dimensional (3D) images.

Additional features, functions, and advantages associated with the disclosed methodology will be apparent from the detailed description which follows, particularly when reviewed in conjunction with the figures appended hereto.

To assist those of ordinary skill in the art in making and using the disclosed embodiments, reference is made to the appended figures, wherein like references are numbered alike.

As set forth herein, the present disclosure advantageously permits and facilitates three-dimensional (3D) rotational X-ray imaging, particularly of ventricular structures, especially for electro physiology (EP) interventions. Furthermore, the present disclosure permits and facilitates shape model based reconstruction from a low number of projections and results in a low dose 4D (e.g., 3D with cardiac phase) X-ray reconstruction.

The present invention may be utilized for various types of applications of 3D/4D imaging. A preferred embodiment of the invention, by way of illustration, is described herein as it may be applied to X-ray imaging as utilized for electro physiology interventions. While a preferred embodiment is shown and described by illustration and reference to X-ray imaging and interventions, it will be appreciated by those skilled in the art that the invention is not limited to the X-ray imaging or interventions alone, and may be applied to imaging systems and applications. Moreover, it will be appreciated that the applications disclosed herein are not limited to interventions alone but are in fact, applicable to any application, in general, where 3D/4D imaging is desired.

It will further be appreciated that, while particular sensors and nomenclature are enumerated to describe an exemplary embodiment, such sensors are described for illustration only and are not limiting. Numerous variations, substitutes, and equivalents will be apparent to those contemplating the disclosure herein.

In an exemplary embodiment, 3D rotational X-ray data of the ventricular structure of interest are acquired concurrent with the measurement of the electrocardiogram (ECG) of the patient. A seed point of the target structure is selected and an adaptive shape model is placed around this seed, with an orientation that is adapted to the patient position and a shape that is preferably one known to represent the target vascular structure well. According to the actual patient data represented in the projection data, the shape model is adapted to multiple cardiac phases. The resulting 4D ventricular model may be utilized directly in the intervention guidance and for the estimation of ventricular parameters. Alternatively, the modeled 3D motion of the shape surface can be used to generate a local motion vector field, which may be utilized to provide compensation for the rotational X-ray data to yield a local motion compensated reconstruction of a 4D data set.

Figure 1:
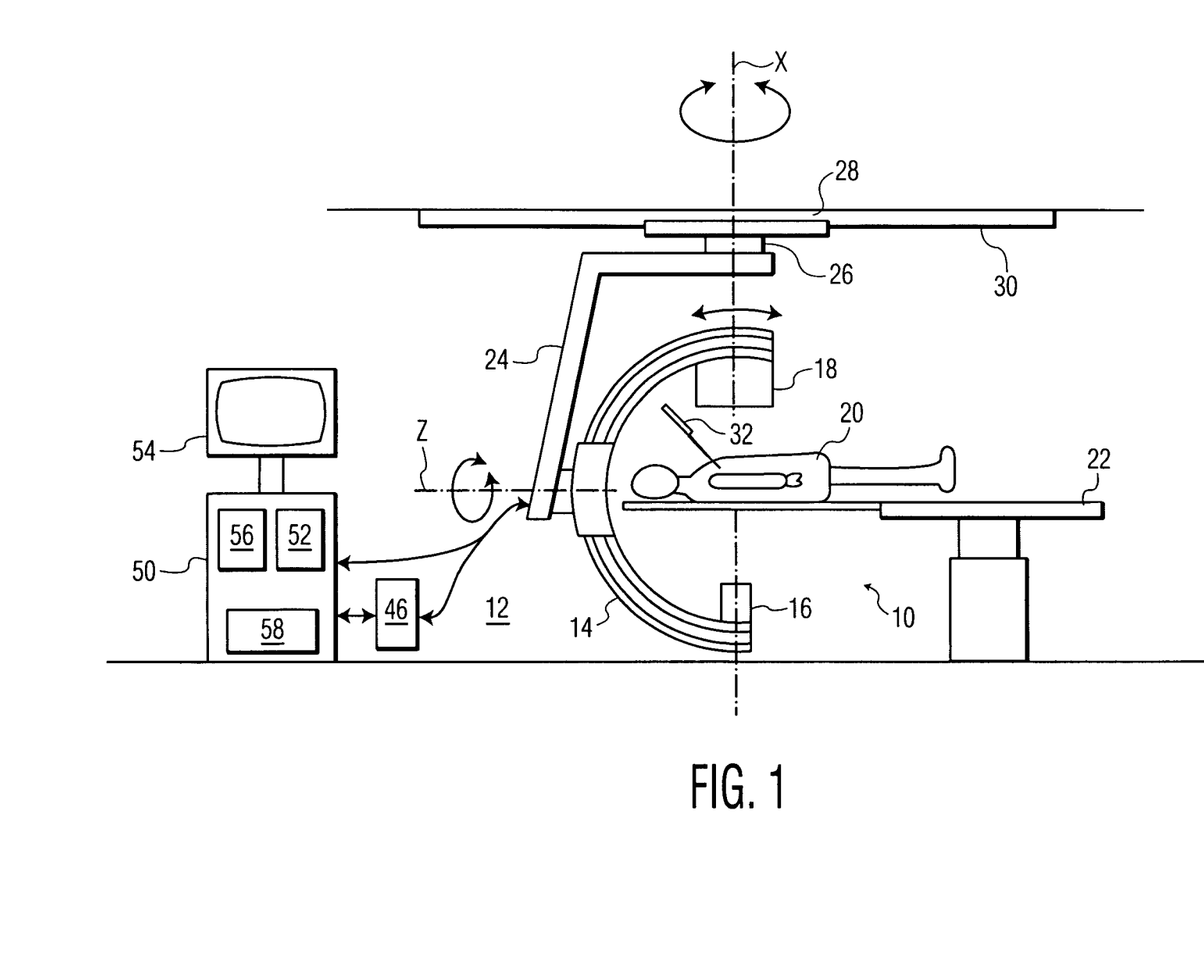
FIG. 1 depicts an X-ray imaging system in accordance with an exemplary embodiment of the invention.

Turning now to FIG. 1, a system is depicted in accordance with an exemplary embodiment of the invention. The system 10 includes an X-ray device 12 with a C-arm 14 with an X-ray tube 16 arranged at a first end and an X-ray detector 18, for example an image intensifier, arranged at its other end. Such an X-ray device 12 is suitable for forming X-ray projection images of a patient 20 arranged on a table 22 from different X-ray positions; to this end, the position of the C-arm 14 can be changed in various directions; the C-arm 14 is also constructed so as to be rotatable about three axes in space, that is, X, Z as shown and Y (not shown). The C-arm 14 may be attached to the ceiling via a supporting device 24, a pivot 26, and a slide 28 which is displaceable in the horizontal direction in a rail system 30. The control of these motions for the acquisition of projections from different X-ray positions and of the data acquisition is performed by means of a control unit 50.

A medical instrument 32 including but not limited to a probe, needle, catheter, guidewire, and the like, as well as combinations including at least one of the foregoing may be introduced into the patient 20 such as during an angiography procedure, a biopsy or an intervention treatment. The position of the medical instrument 32 relative to a three-dimensional image data set of the examination zone of the patient 20 may be acquired and measured with a position measurement system (not shown) and/or superimposed on the 3D/4D images reconstructed as described herein in accordance with an exemplary embodiment.

In addition, an electrocardiogram (ECG) measuring system 46 is provided with the X-ray device 12 as part of the system 10. In an exemplary embodiment the ECG measuring system 46 is interfaced with the control unit 50. Preferably, the ECG of the patient 20 is measured and recorded during the X-ray data acquisition to facilitate determination of cardiac phase. In an exemplary embodiment, cardiac phase information is employed to partition and distinguish the X-ray projection data. It will be appreciated that while an exemplary embodiment is described herein with reference to measurement of ECG to ascertain cardiac phase other approaches are possible. For example, cardiac phase and/or projection data partitioning may be accomplished based on the X-ray data alone, other parameters, or additional sensed data.

The control unit 50 controls the X-ray device 12 and facilitates image capture and provides functions and processing to facilitate image reconstruction. The control unit 50 receives the data acquired (including, but not limited to, X-ray images, position data, and the like) so as to be processed in an arithmetic unit 52. The arithmetic unit 52 is also controlled and interfaced with the control unit 50. Various images can be displayed on a monitor 54 in order to assist the physician during the intervention.

In order to perform the prescribed functions and desired processing, as well as the computations therefore (e.g., the X-ray control, image reconstruction, and the like), the control unit 50, arithmetic unit 52, monitor 54, and reconstruction unit 56, and the like may include, but not be limited to, a processor(s), computer(s), memory, storage, register(s), timing, interrupt(s), communication interface(s), and input/output signal interfaces, and the like, as well as combinations comprising at least one of the foregoing. For example, control unit 50, arithmetic unit 52, monitor 54, and reconstruction unit 56, and the like may include signal interfaces to enable accurate sampling, conversion, acquisitions or generation of X-ray signals as needed to facilitate generation of X-ray projections and reconstruction of 3D/4D images therefrom. Additional features of the control unit 50, arithmetic unit 52, monitor 54, and reconstruction unit 56, and the like, are thoroughly discussed herein.

The X-ray device 12 shown is suitable for forming a series of X-ray projection images from different X-ray positions prior to and/or in the instance on an exemplary embodiment concurrent with an intervention. From the X-ray projection images a three-dimensional image data set, three-dimensional reconstruction images, and if desired X-ray slice images therefrom may be generated. The projections acquired are applied to an arithmetic unit 52 which, in conformity with the method, in accordance with an exemplary embodiment of the invention and then to a reconstruction unit 56 which forms a respective reconstruction image from the projections based on the motion compensation as disclosed at a later point herein. The resultant 3D image can be displayed on a monitor 54. Finally, three-dimensional image data set, three-dimensional reconstruction images, X-ray projection images and the like may be saved and stored in a storage unit 58.

Figure 2:
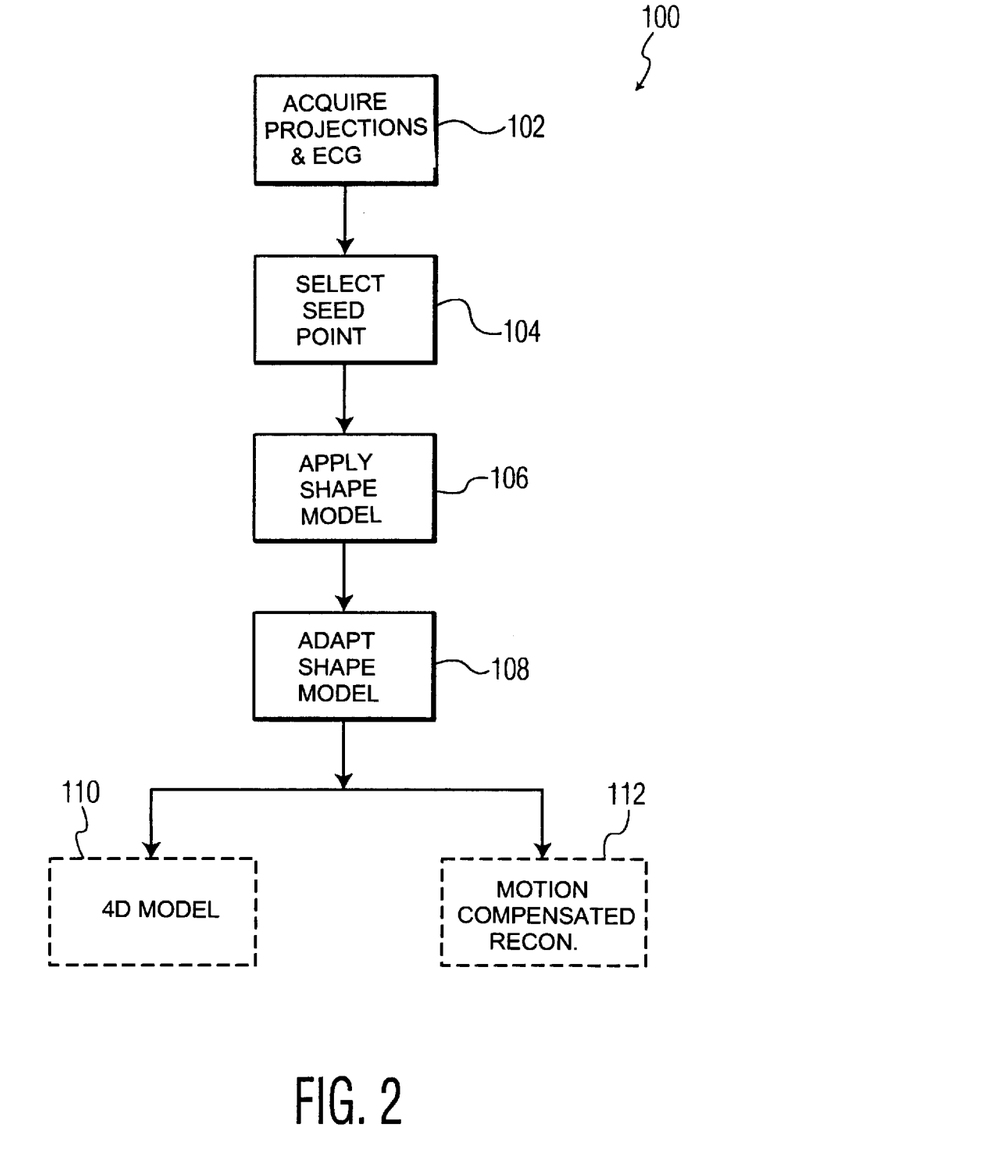
FIG. 2 is a block diagram depicting an example of the disclosed methodologies.
Figure 3:
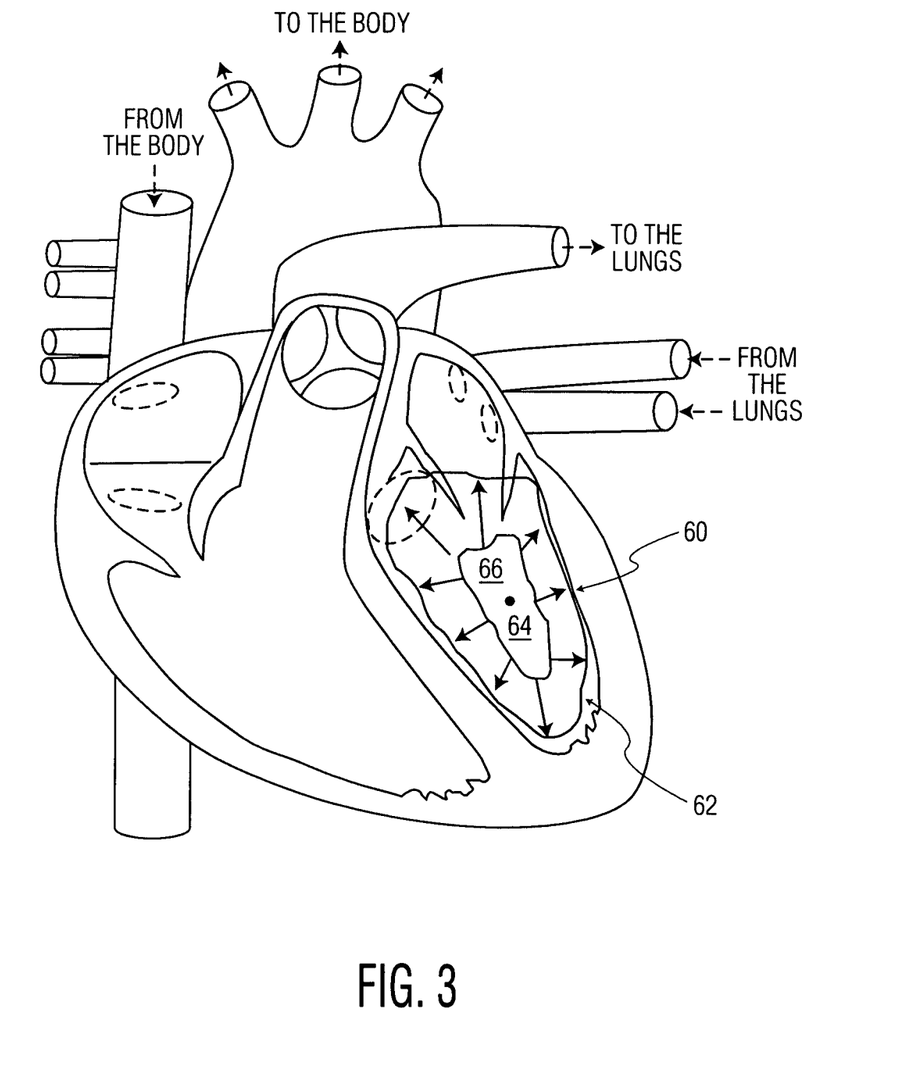
FIG. 3 depicts an example of an exemplary embodiment as applied to an illustration of the heart.

Turning now to FIGS. 2 and 3 as well, FIG. 2 depicts a block diagram 100 illustrating an exemplary embodiment of the disclosed methodologies. FIG. 3 depicts an example of an exemplary embodiment as applied to a diagram of the heart.

Initially, as depicted at block 102, 3D rotational X-ray data of a structure of interest 60 (e.g., a ventricular structure including, but not limited to the left ventricle), are acquired along a trajectory with angular coverage sufficient to facilitate the generating or reconstruction of the 3D images from the image projections. In one embodiment, a coverage angle of at least 180° plus the fan-angle is employed. To facilitate the acquisition of the 3D X-ray data, the contrast of the blood volume contained within the structure of interest 60 is enhanced by contrast agent shown generally as 62. The contrast agent 62 may be applied intravenously, but preferably is supplied directly to the structure of interest 60 via a catheter, so that the structure of interest 60 is filled along the complete rotational acquisition. In parallel to the rotational X-ray data acquisition, the ECG of the patient 20 is measured.

A 3D seed point (e.g., initiation point for a model) 64 in 3D space corresponding to the structure of interest 60 is selected as depicted at block 104. In an exemplary embodiment, the center of the minimum intensity of the projections is employed. However, other seed points 64 and methods for their selection are possible.

Figure 4:
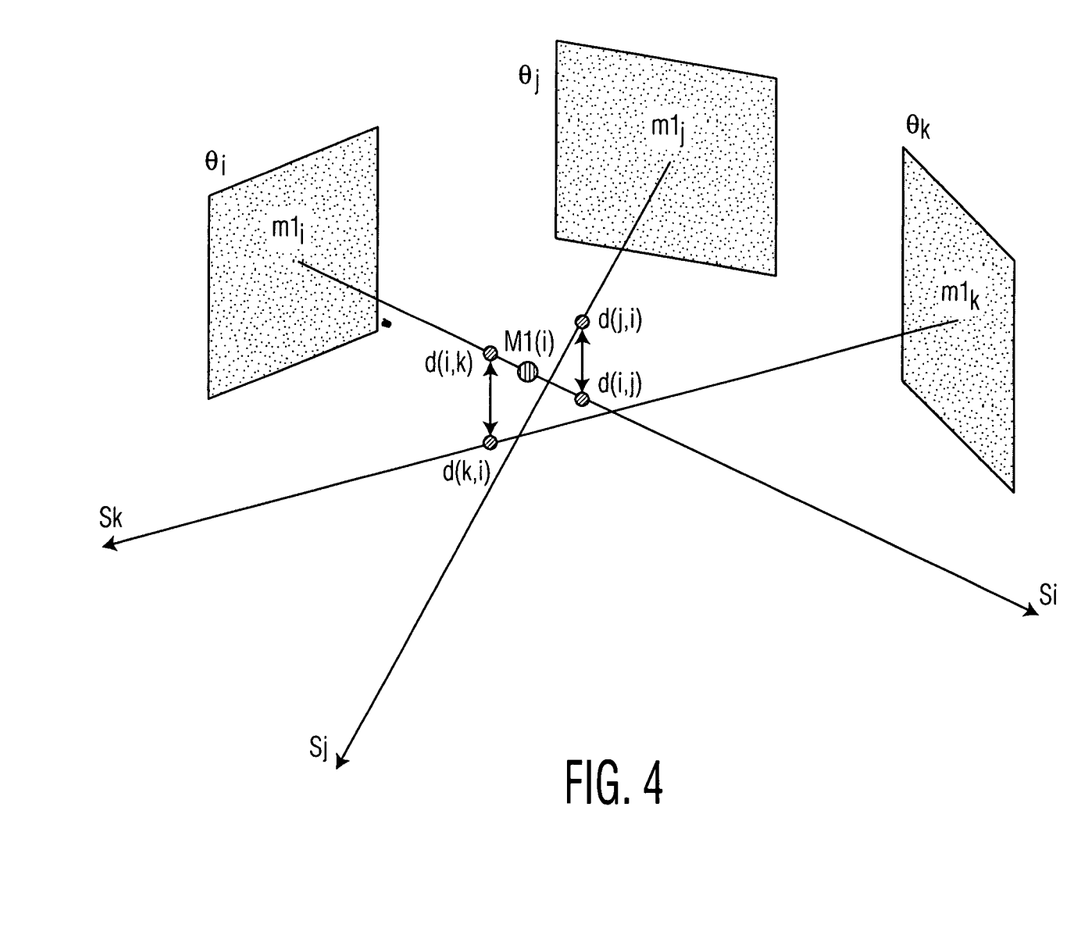
FIG. 4 depicts an illustration of a method for determining a seed point in accordance with an exemplary embodiment of the invention.

Turning now to FIG. 4 as well, to select the 3D seed point 64 in 3D space, on each measured projection, a two-dimensional set of line integrals along a cone beam geometry is measured. For example, when applied to a structure of interest 60 such as a contrast agent filled ventricle in 3D space, the corresponding line integrals through this structure show up with a high value on the detector, after proper calibration. It will be appreciated that originally the intensity is measured, but knowing the intensity of the primary beam, the line integral through the absorption coefficients may be calculated by inverting Lambert Beers Law.

The approximate center of the structure of interest 60, e.g., ventricle, in the projection denoted (m1) is determined for each projection by taking the maximum line integral for that projection, or by convolving the projection with a low pass filter and subsequently taking the maximum to avoid noise. Alternatively, a segmentation method can be applied that searches for certain shapes (which are similar to the projection of a ventricle) in the projection plane and calculate the center of mass of the line integrals within this shape or by means of a different method.

Having determined the approximate center (m1) of the structure of interest 60 in each projection plane, at least three, but preferably more projections belonging to the same cardiac phase are selected from the set of projections for example the projections belonging to the 10% RR interval. One projection of the set of gated projections denoted in this instance $(\theta_i)$, $(\theta_j)$, and $(\theta_k)$ is selected e.g., $(\theta_i)$, corresponding to a selected "angle" or angles associated with this projection, and a ray denoted $S_i$ from the center of the projection of the structure of interest 60 denoted $(m1_i)$ to the source is taken. From all other projections $\theta_j$, $\theta_k$, . . . corresponding to the same phase corresponding rays $S_j$, $S_k$, . . . are generated. The shortest distances to the ray $S_i$ from the other rays e.g., $S_j$, $S_k$ are calculated in 3D space. A set of points d(i,k), d(i,j) on this ray $S_i$ for $(\theta_i)$ results, and the weighted sum M1(i) is calculated according to the following equations:

$$M1(i) = (\Sigma_n d(i,n) w(i,n)) / \Sigma_n w(i,n) \quad (1)$$

$$w(i,n) = \sin(\theta_n - \theta_i). \quad (2)$$

Thereafter, procedure is repeated for the second ray e.g., $S_j$ from $\theta_j$ of the set of gated projections. A set of points d(j,k), d(j,i) on the ray $S_j$ for $(\theta_j)$ results, and the weighted sum M1(j) is calculated, and so on for all the selected projections. For each of the projections, and thus the corresponding rays belonging to the same cardiac phase a 3D point (M1(i), M1(j) and so on, on each of the rays results. Finally, the 3D seed point 60 results as the center of "mass" of these points again achieved by a weighted averaging or summing scheme. The same procedure can be applied for all projections with or without cardiac gating. However, due to cardiac motion, without gating, the result may be disturbed. Advantageously, the above-described methodology delivers a single unique seed point 60 per cardiac phase.

Continuing with FIG. 2, and referring to block 106, after selecting a 3D seed point, an adaptive shape model 66 is applied around this seed point 64. Preferably, but not necessarily, the adaptive shape model 66 is placed with an orientation adapted to the patient position and a shape which is known to represent the target structure of interest 60 well. For example, in a vascular application for cardiac interventions, the shape model 66 is preferably positioned and shaped in a manner similar to the imaged vascular structure e.g., the left ventricle.

Turning to block 108, in an exemplary embodiment, accurate knowledge of the projection geometry associated with the structure of interest 60 is employed as part of an adaptation process to generate forward estimation projections of the shape of the structure of interest 60 onto the various projection data sets. For example, the shape model 66 is adapted for a single cardiac phase based on actual patient data represented in the projection data; namely, the boundary of the structure of interest 60, (e.g., the ventricle) and the values of the line integrals, representing the thickness and absorption of the structure in 3D.

Figure 5A:
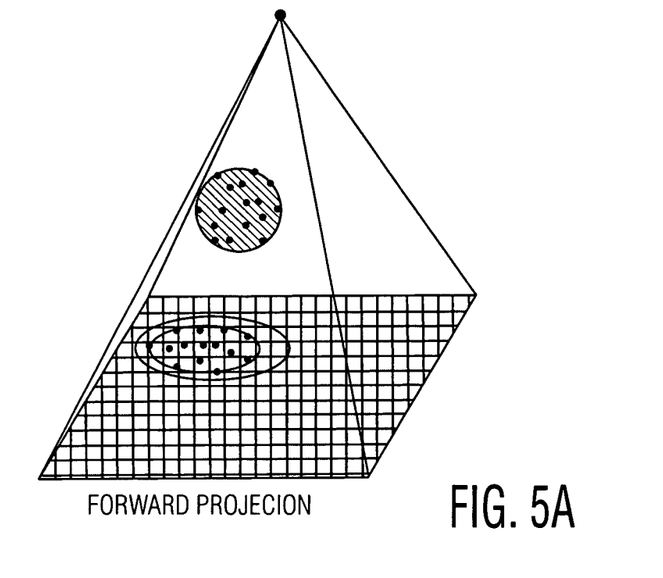
FIG. 5A depicts an illustrative shape model and a forward projection onto the projection of interest.
Figure 5B:
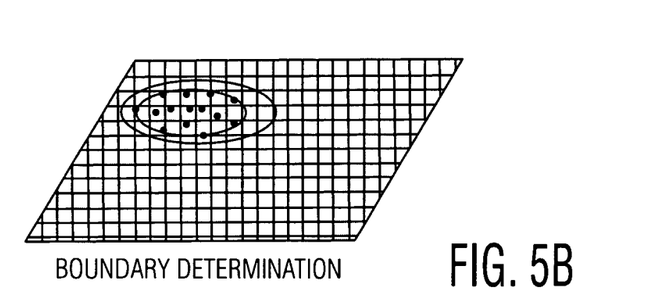
FIG. 5B depicts a boundary determination in accordance with an exemplary embodiment.
Figure 5C:
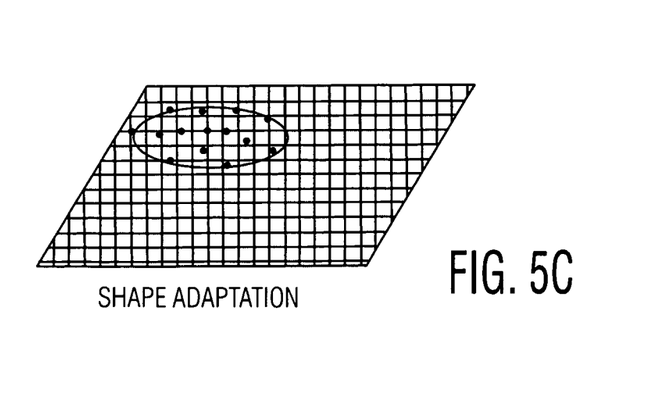
FIG. 5C depicts modification of the bounding points in accordance with an exemplary embodiment.

Turning now to FIGS. 5A-5C as well, in an exemplary embodiment, the adaptation of the 3D shape model 66 is achieved by an adaptation of the model 66 to a selected number of the plurality of projections separately. Optionally, to address a subset of image projections data exhibiting similar motion characteristics, a simultaneous adaptation to all projections which belong to the same cardiac phase may be employed. Provided that the 3D adaptive shape model 66 includes of a number of points distributed on the surface of the shape with a number of connection lines, the adaptation may be formulated as depicted in FIGS. 5A-5C.

Initially, the surface points of the 3D adaptive shape model 66 are forward projected into the projection plane under consideration. FIG. 5A depicts an illustrative shape model and a forward projection onto the projection of interest. Those 3D surface points which are bounding the point cloud in its projection on the detection plane are identified as shown in FIG. 5B. A connection between neighboring bounding points in the detection plane describes the border. For each of the bounding points in the direction perpendicular to the 3D border or to the projected 3D border it is searched for an edge which may represent the border of the structure in the projection data. The bounding points are modified accordingly as depicted in FIG. 5C. It is noteworthy to appreciate that in the instance where multiple gated projections are available, this adaptation is preferably carried out in each of the projections belonging to the same cardiac phase. After having determined the new 3D positions of the bounding points, the other points of the adaptive 3D shape model are modified according to a given inner energy term of the 3D shape.

As additional information to adapt the shape model 66, the line integral through the shape model 66 in 3D space in the direction of the projection under consideration may be taken into account. For example, the line integrals through the adapted 3D shape model 66 may be calculated and the corresponding two-dimensional distribution of line integrals in the particular projection can be correlated with the measured values to determine the optimal 3D shape adaptation based on the 2D boundary modification.

The shape adaptation can be performed in a single adaptation step based on both measures (edge detection and line integral distribution) or it can be carried out in an iterative manner.

It will be appreciated that advantage is taken of the various known or inferable information to further constrain and facilitate the adaptation of the shape model 66. For example, in one exemplary embodiment, to facilitate the adaptation, the known orientation of the patient permits certain logical assumptions or "educated guesses" corresponding to the "likely" orientation of the structure of interest 60. Similarly, known information regarding the structure of interest for individual patients may be employed to further facilitate the adaptation of the shape model 66. Furthermore, it should be appreciated that concurrent or subsequent adaptation for other cardiac phases may optionally involve knowledge about the shape model or the shape of the structure of interest 60 in neighboring phases and thereby, restrict shape changes to result in a continuous movement of the shape model surface. It should also be appreciated that increasingly more accurate placement and initial shape for the shape model 66 improves adaptation by minimizing the differences between the actual shape of the structure of interest 60 and that modeled and reducing the iterations required for the adaptation to achieve a satisfactory result.

Finally, the resulting 4D ventricular model may be used directly to facilitate intervention guidance and for the estimation of ventricular parameters by providing 4D images as generated from the shape model 60 as adapted based on the initial X-ray projections. This approach is depicted as block 110 in FIG. 2. Alternatively, the 3D motion of the shape model surface can be employed to generate a local motion vector field, which can be applied during the reconstruction process resulting in a motion compensated reconstruction of the rotational X-ray data. Thereby, all available projections are motion compensated during the reconstruction process with respect to a certain reference state. This approach is depicted at block 112 in FIG. 2.

It should be noted that the non-dynamic part of the disclosed methodology may be used to generate 3D models of static structures. Furthermore, it will be appreciated that the techniques disclosed herein are readily applicable to any application where a shape is changed or moved by a periodic movement during a rotational data acquisition.

In yet a further embodiment of the disclosed invention is to generate the required chamber information by means of modeling. Here, the outline of the chambers is being defined in multiple projections obtained in the same cardiac phase from different projection directions. The outlined chamber structure is used for the calculation of the 3D shape of the chambers. This technique can also be extended to 4D modeling, providing the functional information.

In sum, the disclosed invention advantageously permits and facilitates three-dimensional (3D) rotational X-ray imaging, particularly of ventricular structures, especially for electro physiology (EP) interventions. Furthermore, the present disclosure permits and facilitates shape model based reconstruction from a low number of projections and results in a low dose 4D (e.g., 3D with cardiac phase) X-ray reconstruction. The disclosed system and methodologies provide significant benefits to operators, particularly physicians, relying on 3D/4D reconstructions for guidance and navigation during electro physiology interventions. Indeed, the disclosed system and methodology provides modeling and/or reconstruction of 3D/4D image data particularly addressing compensation for motion induced in the cardiac cycle. An additional advantage of the disclosed system and methodologies is that the modeling and reconstructions can be performed based on a reduced set of X-ray projections resulting in lowered patient dosage.

It will be evident that there exist numerous numerical methodologies in the art for implementation of mathematical functions, in particular as referenced here, line integrals, filters, taking maximums, and summations. While many possible implementations exist, a particular method of implementation as employed to illustrate the exemplary embodiments should not be considered limiting.

The system and methodology described in the numerous embodiments hereinbefore provides a system and methods for modeling and/or reconstruction of 3D/4D image data particularly addressing compensation for motion induced in the cardiac cycle. In addition, the disclosed invention may be embodied in the form of computer-implemented processes and apparatuses for practicing those processes. The present invention can also be embodied in the form of computer program code containing instructions embodied in tangible media 58, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of "first" and "second" or other similar nomenclature for denoting similar items is not intended to specify or imply any particular order unless otherwise specifically stated. Likewise the use of "a" or "an" or other similar nomenclature is intended to mean "one or more" unless otherwise specifically stated.

While the invention has been described with reference to an exemplary embodiment thereof, it will be understood by those skilled in the art that the present disclosure is not limited to such exemplary embodiments and that various changes may be made and equivalents may be substituted for elements thereof without departing from the scope of the invention. In addition, a variety of modifications, enhancements, and/or variations may be made to adapt a particular situation or material to the teachings of the invention without departing from the essential spirit or scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for generating or reconstructing three-dimensional (3D) images based on image projection data corresponding to a structure of interest, the method comprising:
   acquiring a plurality of image projections corresponding to a structure of interest in at least first and second motion phases;
   monitoring the motion phases of the structure of interest as the plurality of image projections are acquired;

adapting a 3D shape model to the image projections acquired in the first motion phase of the structure of interest to represent said structure of interest in the first motion phase, thereby yielding an adapted 3D shape model in the first motion phase;

adapting the 3D shape model to the image projections acquired in the second motion phase to generate a second adapted 3D model representing the structure of interest in the second motion phase;

generating a motion vector field based on said first and second adapted 3D shape models and said motion of said structure of interest; and reconstructing a 3D image of the structure of interest in a selected motion phase using said motion vector field and the first and second motion phase projection images.

2. The method of claim 1, further including:
generating the 3D images based on said adapted shape model to represent the structure of interest in the selected phase of motion.

3. A non-transitory computer readable medium carrying software which controls one or more processors to perform the method of claim 1.

4. A method for generating or reconstructing three-dimensional (3D) images based on image projection data corresponding to a structure of interest, the method comprising:
acquiring a plurality of image projections corresponding to a structure of interest in each of a plurality of motion phases;

monitoring the motion phases of the structure of interest as the plurality of image projections are acquired;

selecting a first motion phase for said structure of interest;

selecting a first seed point from the image projections acquired in the selected phase of motion of the structure of interest;

applying a 3D shape model at said first seed point;

adapting said 3D shape model to the image projections acquired in the first phase of motion of the structure of interest to represent said structure of interest in the first phase of motion, thereby yielding an adapted 3D shape model in the first phase of motion;

selecting a second motion phase of the structure of interest;

selecting a second seed point from the image projections acquired in the second motion phase;

applying the 3D shape model at the second seed point;

adapting the 3D shape model to the image projections acquired in the second selected motion phase to generate a second adapted 3D model representing the structure of interest in the second motion phase;

selecting a third motion phase of the structure of interest;

selecting a third seed point from the image projections acquired in the third motion phase;

applying the 3D shape model at the third seed point;

adapting the 3D shape model to the image projections acquired in the third selected motion phase to generate a third adapted 3D model representing the structure of interest in the third motion phase; and adapting the 3D shape model in the first, second, and third selected motion phases to achieve a continuous movement of a surface of the 3D shape model among the first, second, and third motion phases.

5. A non-transitory computer readable medium carrying software for controlling one or more processors to perform the method of claim 4.

6. A method for generating or reconstruction of three-dimensional (3D) images based on image projection data corresponding to a structure of interest, the method comprising:

acquiring a plurality of image projections corresponding to a structure of interest with angular coverage sufficient to facilitate the generating or reconstruction of the 3D images from said image projections;

selecting a 3D seed point, wherein said 3D seed point corresponds to a center of mass of about the minimum intensity of a selected set of said plurality of said image projections;

applying a shape model at said 3D seed point; and adapting said shape model to represent said structure of interest, thereby yielding an adapted shape model.

7. The method of claim 6, further including:
acquiring data indicative of motion of said structure of interest associated with said image projections;

adapting said shape model to represent said structure of interest based on said data indicative of motion of said structure of interest, thereby yielding another adapted shape model; and generating the 3D images of said structure of interest based on said another adapted shape model.

8. The method of claim 6, wherein the structure of interest is moving through a plurality of phases of motion during acquiring of the plurality of image projections and further including:
generating a motion vector field is based on the moving of the structure of interest through the plurality of phases of motion;

adapting the shape model to represent said structure of interest in other phases of motion.

9. The method of claim 6, further including determining the center of mass by:
determining a center of the structure of interest in each of the image projections;

projecting a ray from the determined center of the structure of interest in each of the projections;

determining points of minimum distance between pairs of the rays;

calculating the center of mass from the determined points of minimum distance.

10. The method of claim 6, further including:
displaying the adapted shape model to represent said structure of interest.

11. The method of claim 6, wherein the structure of interest is moving through a plurality of motion phases while the image projections are being acquired and wherein said adapting is repeated a plurality of times, each time based on a subset of said plurality of image projections acquired in each of the plurality of motion phases.

12. The method of claim 6, wherein the image projections are acquired over an angular span corresponding to at least about a 180 degrees plus fan angle.

13. A system for generation and reconstruction of three-dimensional (3D) images comprising:
an imaging system which generates projection images of a 3D structure of interest; and one or more processors in operable communication with said imaging system, said one or more processors programmed to:
receive said projection images in at least first and second phases of motion, select a 3D seed point;

apply a 3D shape model at said 3D seed point;

adapt said 3D shape model to the projection images in at least the first and second phases of motion to generate at least first and second motion phase adapted 3D shape models;

generate a motion field based on at least the first and second shape adapted 3D shape models.

14. The system of claim 13, wherein said one or more processors are further configured to generate the 3D images of said structure of interest based on said motion shape adapted 3D shape models.

15. The system of claim 14, wherein the 3D images are further based on a selected phase of motion for said structure of interest.

16. The system of claim 13, wherein one or more processors are further programmed to:
generate a motion vector field based on at least the first and second motion shape adapted models; and
reconstruct a 3D image of the structure in a selected motion phase using the motion vector field and at least the first and second motion phase projection images.

17. The system of claim 13, wherein said projection images span an angular coverage sufficient to reconstruct the 3D images from the projection images.

18. The system of claim 17, wherein said angular coverage corresponds to at least about a 180 degrees plus fan angle.

19. The system of claim 13 further including:
a measurement system operatively connected with the one or more processors or said imaging system, said measurement system configured to provide data indicative of motion of said structure of interest associated with said image projection images;
the one or more processors being further programmed to adapt said 3D shape model to represent said structure of interest based on data indicative of motion of said structure of interest, thereby yielding another adapted 3D shape model; and
generating the 3D images of said structure of interest based on said another adapted 3D shape model.

20. The system of claim 13, further including:
a motion monitor which generates data indicative of motion of the structure of interest substantially concurrent with acquiring said plurality of projection images.

21. The system of claim 13, wherein said structure of interest includes a coronary vessel or a cardiac chamber.

22. The system of claim 13 wherein said imaging system includes a C-arm X-ray imaging system.

23. A system for generation and reconstruction of three-dimensional (3D) images comprising:
an imaging system which generates projection images of a 3D structure of interest; and
one or more processors in operable communication with said imaging system, said one or more processors programmed to:
receive said projection images,
determining a center of the structure of interest in each of the image projections;
project a ray from the determined center of the structure of interest in each of the projections;
determine points of minimum distance between pairs of the rays;
calculate a center of mass from the determined points of minimum distance;
apply a 3D shape model at the center of mass; and
adapt said 3D shape model based on the projection images to represent the 3D structure of interest thereby yielding an adapted 3D shape model.

24. The system of claim 23, wherein the projection images represent the structure of interest in a plurality of phases of motion and wherein the one or more processors are further programmed to:
select projection images in a first of the phases of motion; and
adapt the 3D shape model to the projection images in the first phase of motion to generate a first motion phase adapted 3D motion model.

25. The system of claim 24, wherein the one or more processors are further programmed to:
select projection images in a second of the phases of motion;
adapt the 3D shape model to the projection images in the second phase of motion to generate a second motion phase adapted 3D motion model.

26. An apparatus for generating a three-dimensional image of a structure of interest which is moving through a series of motion phases, the system comprising:
an imaging system which generates a plurality of image projections including the structure of interest from a plurality of angular orientations and over the series of the motion phases;
a motion monitoring apparatus which monitors movement of the structure of interest through the series of motion phases;
one or more processors in communication with the imaging apparatus and the motion monitoring apparatus, the one or more processors being programmed to:
in each of a plurality of the projection images in a common motion phase, identifying a point adjacent a center of the structure of interest;
from each identified point, projecting a ray from the image projection;
selecting a seed point adjacent a convergence of the rays;
applying a shape model at the seed point;
projecting the shape model onto each of the image projections in the common motion phase;
adapting the projections of the shape model to the projection of the structure of interest in each of the image projections in the common motion phase to generate a 3D shape model which represents the structure of interest.

* * * * *